US011806900B2

(12) United States Patent
Legh et al.

(10) Patent No.: US 11,806,900 B2
(45) Date of Patent: Nov. 7, 2023

(54) SEALING DEVICE FOR USE IN MOLDED FOAM PAD PRODUCTION

(71) Applicant: LEAR CORPORATION, Southfield, MI (US)

(72) Inventors: Darren Legh, Wolverhampton (GB); Antony Baxter, Warwickshire (GB); Myriam Molina, Coventry (GB); Christopher Whiley, Wolverhampton (GB)

(73) Assignee: LEAR CORPORATION, Southfield, MI (US)

( * ) Notice: Subject to any disclaimer, the term of this patent is extended or adjusted under 35 U.S.C. 154(b) by 506 days.

(21) Appl. No.: 16/992,521

(22) Filed: Aug. 13, 2020

(65) Prior Publication Data

US 2022/0048220 A1    Feb. 17, 2022

(51) Int. Cl.
*B29C 33/00* (2006.01)
*B29C 44/58* (2006.01)
(Continued)

(52) U.S. Cl.
CPC ...... *B29C 33/0038* (2013.01); *B29C 33/0033* (2013.01); *B29C 44/02* (2013.01); *B29C 44/58* (2013.01); *B29K 2105/04* (2013.01)

(58) Field of Classification Search
CPC ............ B29C 33/0038; B29C 33/0033; B29C 44/583; B29L 2031/58
See application file for complete search history.

(56) References Cited

U.S. PATENT DOCUMENTS 4,452,420 A * 6/1984 Lundquist ............... B29C 33/76
                                                     249/142
4,941,642 A * 7/1990 Stoll .................... B29C 33/0033
                                                     249/177
(Continued)

FOREIGN PATENT DOCUMENTS

AT          506 068 B1     6/2009
DE       198 01 328 A1     7/1999
(Continued)

OTHER PUBLICATIONS

German Office Action for Application No. 102021120768.1 dated Jul. 7, 2022, 6 pages.

*Primary Examiner* — Kelly M Gambetta
*Assistant Examiner* — Virak Nguon
(74) *Attorney, Agent, or Firm* — Brooks Kushman P.C.

(57) ABSTRACT

A mold tool assembly includes a first tool having a protrusion for producing a respective hole in a foam body and a second tool configured to cooperate with the first tool to mold the foam body. The second tool defines a cavity corresponding to the protrusion. The mold tool assembly also includes a movable plunger for clearing flash corresponding to and located at least partially within the cavity in the second tool, and movable between a disengaged position when the first and second tools are separated, and an engaged position when the first and second tools are closed. The mold tool assembly also includes an actuator configured to move the movable plunger between the engaged position and the disengaged position. In the engaged position, the movable plunger contacts the protrusion to seal the cavity, and in the disengaged position, at least a portion of the movable plunger extends below a bottom surface of the second tool into the hole.

14 Claims, 3 Drawing Sheets

(51) Int. Cl.
*B29C 44/02* (2006.01)
*B29K 105/04* (2006.01)

(56) References Cited

U.S. PATENT DOCUMENTS

| | | |
|---|---|---|
| 6,830,443 B1 | 12/2004 | Coffey et al. |
| 6,905,643 B2 | 6/2005 | Junker et al. |
| 9,308,675 B2 | 4/2016 | Wiesmayer |
| 2006/0198921 A1 | 9/2006 | Fujita |
| 2017/0305046 A1* | 10/2017 | Fujisawa ................. B29C 44/02 |

FOREIGN PATENT DOCUMENTS

| | | |
|---|---|---|
| DE | 10 2013 209 465 A1 | 7/2014 |
| DE | 10 2017 108 449 A1 | 10/2017 |
| JP | H05269768 | 10/1993 |
| JP | 2005-193483 A | 7/2005 |
| JP | 2007185841 A * | 7/2007 |

* cited by examiner

SEALING DEVICE FOR USE IN MOLDED FOAM PAD PRODUCTION

TECHNICAL FIELD

The present application is directed to a mold tool assembly, and more particularly, to a mold tool for forming a foam body with holes.

BACKGROUND

Vehicle seats are typically formed from molded foam bodies forming the cushions. A plurality of climate or comfort holes can be formed extending through the foam body for achieving the desired air flow for comfort. The climate holes can provide air flow paths through the cushion for heating and/or cooling the occupant surface for climate comfort by extending from the bottom of the cushion to the occupant surface. Comfort holes can also provide seating comfort, particularly for modifying the hardness of the foam body.

SUMMARY

According to one or more embodiments, a mold tool assembly includes a first tool having a protrusion for producing a respective hole in a foam body and a second tool configured to cooperate with the first tool to define a foam body cavity for molding the foam body. The second tool defines a protrusion cavity corresponding to the protrusion. The mold tool assembly also includes a movable plunger for clearing flash corresponding to and located at least partially within the protrusion cavity in the second tool, and movable between a disengaged position when the first and second tools are separated, and an engaged position when the first and second tools are closed. The mold tool assembly also includes an actuator configured to move the movable plunger between the engaged position and the disengaged position. In the engaged position, the movable plunger contacts the protrusion to seal the protrusion cavity, and in the disengaged position, at least a portion of the movable plunger extends below a bottom surface of the second tool into the hole.

In one or more embodiments, the actuator may be biased in the disengaged position, such that in the engaged position the protrusion may push the movable plunger against the bias. In certain embodiments, the actuator may be a spring and the movable plunger may be displaced between the engaged and disengaged position based on compression and decompression of the spring. Further, the spring may be positioned around a shaft body of the movable plunger within the cavity to compress and decompress based on movement of the movable plunger. In further embodiments, the spring may have a spring rate of at least 5 N/mm. In at least one embodiment, the movable plunger may include a rib portion around at least a portion of a periphery of the movable plunger. In further embodiments, the rib portion may contact an inner wall of the second tool defining the protrusion cavity and clears foam from the protrusion cavity when the movable plunger moves between the engaged and disengaged positions. In at least one embodiment, the actuator may be a hydraulic actuator for pushing the movable plunger into the disengaged position after the movable plunger is moved into the engaged position via engagement with the protrusion.

According to one or more embodiments, a mold tool assembly includes a first tool having a protrusion for producing a respective hole in a foam body and a second tool configured to cooperate with the first tool to define a foam body cavity for molding the foam body. The second tool defines a protrusion cavity corresponding to the protrusion. The mold tool assembly further includes a movable plunger for clearing flash corresponding to and located at least partially within the protrusion cavity in the second tool. The movable plunger is movable between a disengaged position when the first and second tools are separated, and an engaged position when the first and second tools are closed, the movable plunger having a bias in the disengaged position. In the engaged position, the movable plunger contacts the protrusion to seal the protrusion cavity, and in the disengaged position, the bias shifts the movable plunger such that at least a portion of the movable plunger extends below a bottom surface of the second tool into the hole.

In at least one embodiment, the first tool may include a plurality of protrusions and the second tool includes a plurality of protrusion cavities corresponding to the plurality of protrusions. Further, the mold tool assembly may include a plurality of movable plungers with a respective movable plunger for each of the plurality of protrusion cavities. In at least one embodiment, the mold tool assembly may further include an actuator cooperating with the movable plunger to bias the movable plunger in the disengaged position, wherein the actuator may be a spring having a spring rate of at least 5 N/mm. In certain embodiments, the protrusion has a diameter of 5 to 35 mm. In at least one embodiment, in the engaged position, a bottom of the movable plunger may be substantially aligned with the bottom surface. In one or more embodiments, the movable plunger may include a rib portion around at least a portion of a periphery of the movable plunger, the rib portion contacting an inner wall of the second tool defining the protrusion cavity and clears foam from the protrusion cavity when the movable plunger moves between the engaged and disengaged positions.

According to one or more embodiments, a method of forming a foam body with holes includes providing a first tool having a protrusion and a second tool having a protrusion cavity corresponding to the protrusion, and the first and second tools cooperating to define a foam body cavity to form a mold assembly, and positioning a movable plunger at least partially within the protrusion cavity. The method also includes closing the mold tool assembly such that the movable plunger engages the protrusion to seal the protrusion cavity, and molding a foam body with the protrusion forming a hole. The method further includes opening the mold tool assembly such that the movable plunger disengages the protrusion and clears foam from the hole.

In one or more embodiments, the closing of the mold tool assembly may push the movable plunger at least partially into the protrusion cavity upon engagement with the protrusion. In certain embodiments, upon opening the mold tool, the movable plunger may be positioned at least partially below a bottom surface of the second tool. In at least one embodiment, the closing and opening may move the movable plunger over a height based on an actuator. In some embodiments, the actuator may be biased such that engaging the movable plunger with the protrusion stores energy in the actuator for moving the plunger the height upon opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

When forming holes to aid flow for climate applications and for comfort in a molded foam body, the mold tool includes a plurality of protrusions on a first tool extending toward a second tool such that when the tool is closed, the foam is molded around these protrusions corresponding to each of the holes being formed in the molded foam body. The holes may extend over a height of the molded foam body, and may be continuous from a bottom surface to a top surface of the molded foam body such that the hole is open at both surfaces. The continuous aspect of the holes is particularly helpful for climate holes, where air flow through the hole is desired. The opening at the bottom surface of the molded foam body is formed by the base of the protrusion in the first tool, however during production, the opening at the top end of the foam body near the second tool may have flash form at the edges at the interface between the molds or a have a thin film covering an end of the continuous hole formed by leak of foam into the second tool. When the continuous climate holes are produced, these thin layers or film that form across the top of the hole require that the foam body be checked post-molding and cropped in a post-production step to remove the material from the top of the hole. Additionally, the flash formed at the interface between the upper and first tool tools may affect the uniformity of the continuous hole in the foam body. Thus, in conventional foam molding processes, post-formation processing is typically required for removing the flash or thin films caused at the first and second tool interface to open the end of each of the holes.

Figure 1:
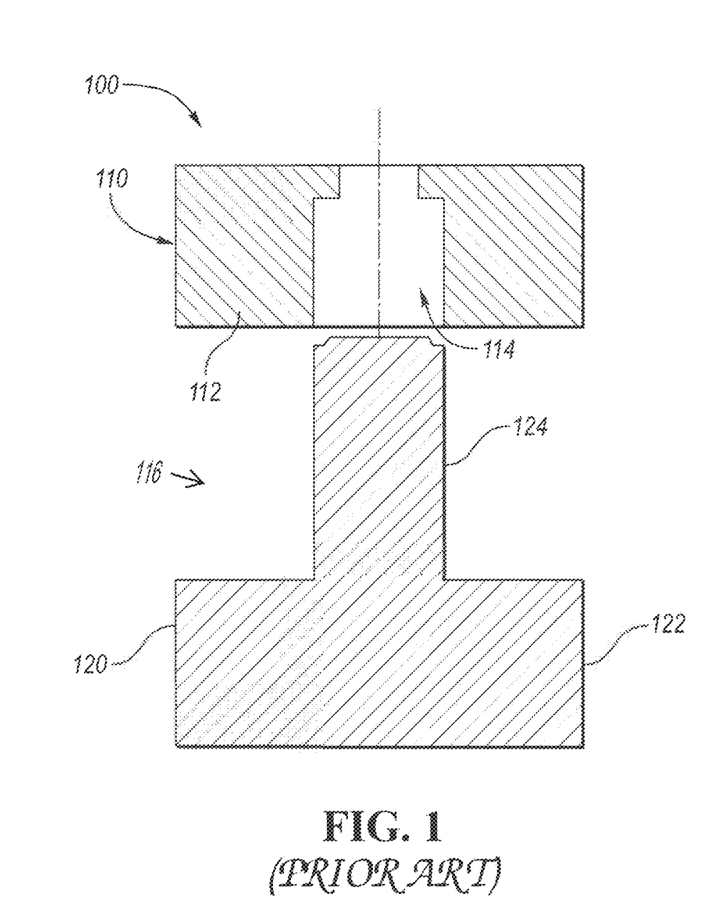
FIG. 1 is a schematic illustration of a partial cross-section of a conventional mold assembly.

Referring to FIG. 1, a schematic section of a conventional mold tool assembly 100 for forming a foam body with climate/comfort holes is shown. Hereinafter, the climate/comfort holes will be generally referred to as holes. Conventional mold tool assembly 100 includes a first tool 120 and a second tool 110, which cooperate to form a cavity 116 for foam to fill and form the foam body. To form the holes in the foam body, first tool 120 includes a base member 122 and a plurality of protrusions extending upward from the first tool 120 toward second tool 110. Although only one protrusion 124 is shown in FIG. 1, any number of protrusions may be included on first tool 120 in any suitable arrangement as desired for the foam body based on design or comfort considerations, and the reference to a single protrusion in the mold is shown by way of example of a section of the mold tool assembly. Second tool 110 includes a body 112 defining a plurality of cavities 114, each of which corresponds to a respective one of the protrusions 124. Again, FIG. 1 shows a section of the mold tool assembly, and only one cavity 114 is shown, however any number of cavities may be included in second tool 110 based on the protrusions 124. The cavity 114 of the second tool receives the top end of the protrusion 124 such that the foam can flow around the protrusion 124 to form a continuous hole in the foam body from top to bottom. In conventional mold assembly 100, foam may leak into the cavity 114 and over the top of protrusion 124 and form a thin film over the opening of the hole, and form flash at the interface between the second tool 110 and first tool 120 at the hole. Thus, post-processing steps typically are required to follow the molding to remedy the issues of thin film and flash.

Figure 2:
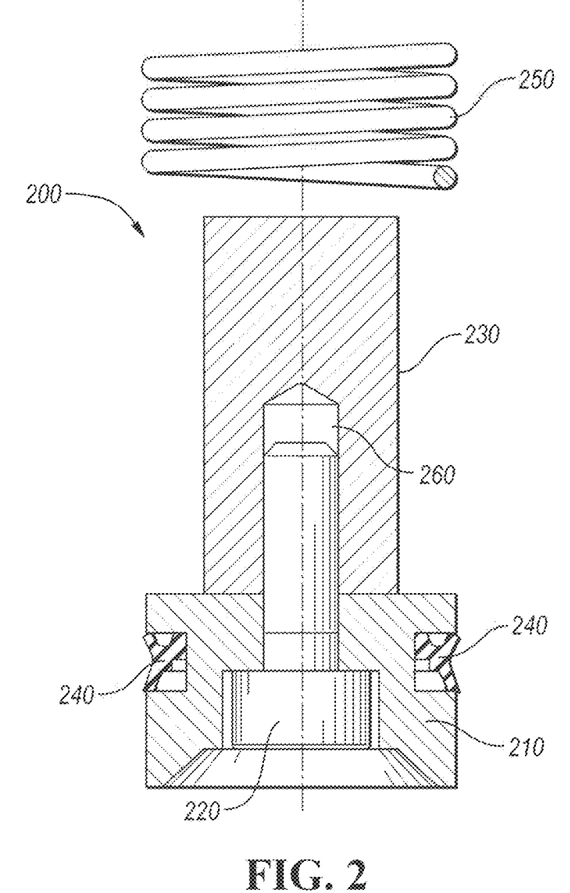
FIG. 2 is a schematic illustration of a cross-section of a shaft assembly for a mold tool, according to an embodiment.

Referring to FIG. 2, a schematic illustration for a shaft assembly or movable plunger 200 is shown according to an embodiment. Shaft assembly and movable plunger may be interchangeably referred to hereinafter. The shaft assembly 200 is used with a mold told assembly to remove flash and the thin film layer from the continuous hole in the cushion body upon opening the mold tool assembly such that post-processing is not necessarily required. Shaft assembly 200 is movable between an engaged and disengaged position within the mold tool by an actuator, such as, but not limited to, a solenoid, pneumatic actuator, a hydraulic actuator, a spring, etc. The actuator may be automated, movable based on a bias (i.e., a spring as shown in FIG. 2), or any other suitable mechanism for shifting the movable plunger 200 between an engaged and disengaged position. Each plunger 200 may be individually coupled with an actuator, or there may be a single external (to the tool assembly) actuator for controlling the plunger movement within the tool assembly. Although a piston 210 and spring 250 are shown as contact for the protrusion and the actuator, respectively, in FIG. 2, any other suitable mechanism (hydraulically controlled plunger, solenoids, etc.) may be used to move the movable plunger between an engaged state (with the protrusion contacting the movable plunger to seal the cavity of the first tool from foam leakage over the protrusion), and a disengaged state (where the bottom of the movable plunger 200 is positioned vertically below the bottom surface of the body 312 of the second tool 310 such that it removes flash or any thin film formed at the hole opening (as shown in FIGS. 3A-C)).

Figure 3A:
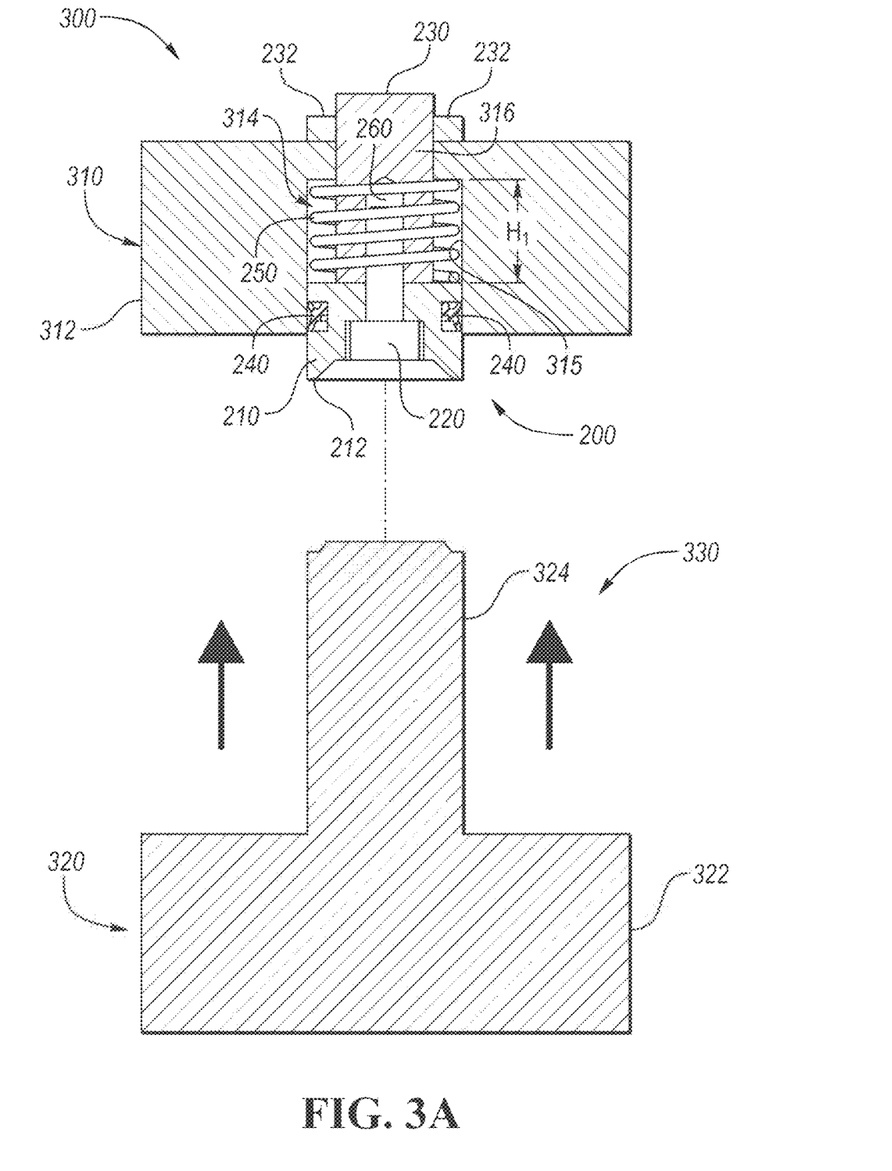
FIGS. 3A-C are schematic illustrations of a partial cross-section of a mold tool with a shaft assembly molding foam with holes, according to an embodiment.
Figure 3B:
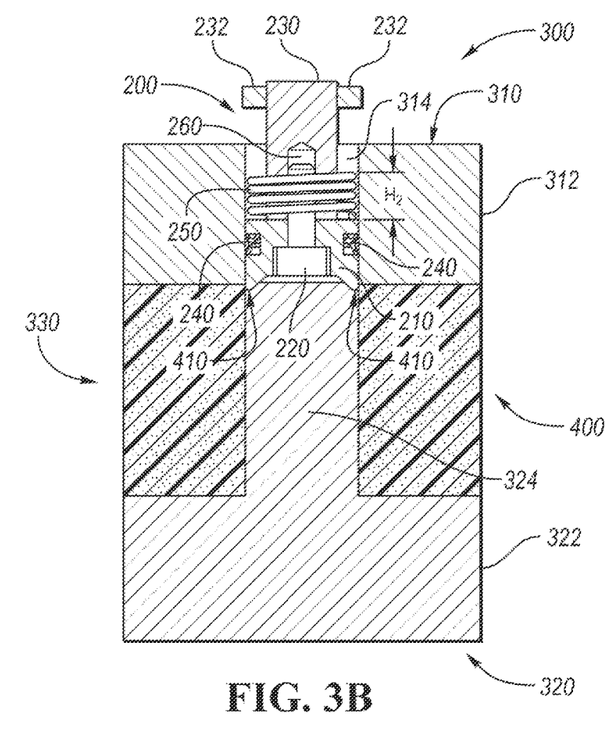
Figure 3C:
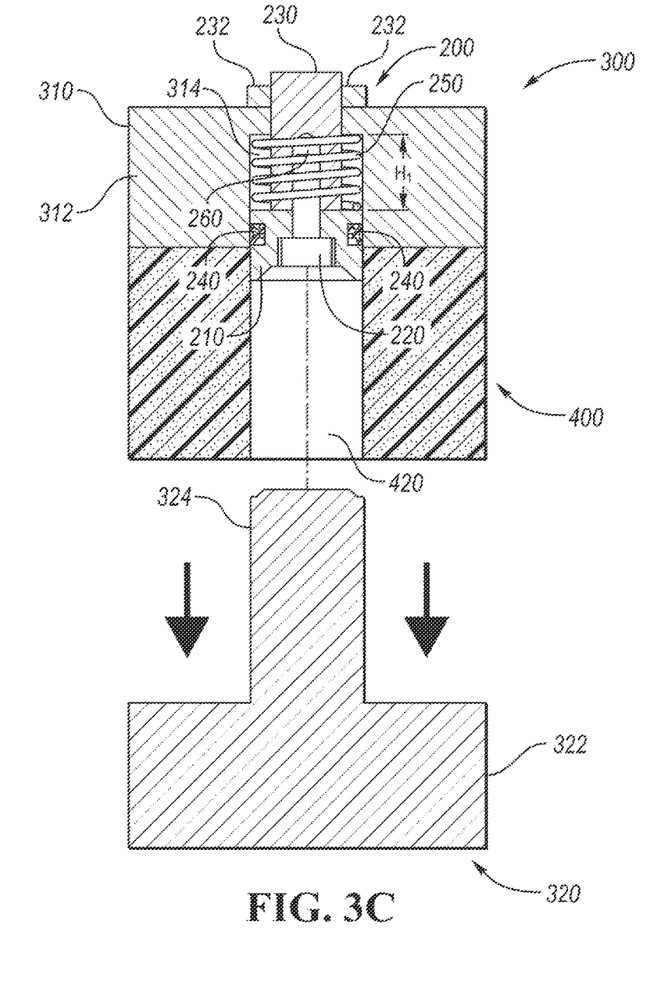

Referring to FIGS. 3A-C, the engaged and disengaged position of the shaft assembly 200 is coordinated with the closed and open positions of the mold tool assembly 300, respectively. Mold tool assembly 300 is shown with shaft assembly 200, and includes a second tool 310 and a first tool 320 cooperate to form a cavity 330 for foam to fill and form the foam body 400. To form the holes in the foam body 400, first tool 320 includes a base member 322 and a protrusion 324 extending upward from the first tool 320 toward second tool 310. Although only one protrusion 324 is shown in FIGS. 3A-C, any suitable number of protrusions may be included on first tool 320 in any suitable arrangement as desired for the foam body 400 based on design or comfort considerations, and the reference to a single protrusion is shown by way of example of a section of the mold tool assembly 300. Hereinafter, protrusion 324 will be referred to in the singular form, and is not intended to be limiting. Furthermore, although not shown in the Figures, the protrusion 324 may be on the second tool and the features reversed between the upper and first tool. The protrusion 324 may be sized based on the desired hole size in the foam body 400. In one or more embodiments, the protrusions may have a diameter of about 5 to 35 mm, in other embodiments, a diameter of about 7 to 30 mm, and in yet other embodiments, a diameter of about 10 to 25 mm. Thus, the resulting hole 420 in the foam body 400 may have, in certain embodiments, a diameter of about 5 to 35 mm, in other embodiments, a diameter of about 7 to 30 mm, and in yet other embodiments, a diameter of about 10 to 25 mm. In one or more embodiments, the protrusions are uniformly sized and shaped, in other embodiments, each protrusion has a unique size or shape, and in yet other embodiments, there are sets of protrusions corresponding to a particular size or shape. Although the protrusions are shown in the Figures having a round cross-section, the protrusions can have any cross-sectional shape to form the climate holes for providing air flow through the foam cushion body, such as, but not limited to, circular, square, oval, rectangular, or any other suitable shape based on design and desired air flow considerations. Accordingly, the movable plunger 200, as well as other components of shaft assembly 200, may be sized and shaped to match the size and cross-sectional shape of the protrusion.

Second tool 310 includes a body 312 defining a cavity 314 which corresponds to the protrusions 324. The cavity 314 of the second tool houses the movable plunger 200 and, in the engaged position, houses the plunger 200 after it contacts the top end of the protrusion 324 and vertically moves up into the cavity 314, sealing the cavity 314 and forming a flush contact between protrusion 324 and movable plunger 200 such that the foam can flow around the protrusion 324 to form a hole in the foam body 400 from top to bottom. Similarly, although only one cavity 314 is shown in FIGS. 3A-C, the cavities 314 correspond to the number and/or pattern of the corresponding protrusion 324. Furthermore, the opening of the cavity 314 in the second tool may be size shaped according to the cross-sectional shape and size of the movable plunger 200 to house the movable plunger 200.

As shown in FIG. 3A, the protrusion 324 of first tool 320 has a top end for engaging with a piston 210 of the shaft assembly 200. In the engaged position as shown in FIG. 3B, the shaft assembly 200 is contacted by protrusion 324 in the first tool 320, and displaced upward into a cavity 314 in the second tool 310. In the disengaged position, as shown in FIG. 3A (before molding the foam body 400) and FIG. 3C (after the foam body 400 has been molded), the shaft assembly 200 is lowered back down a distance over the height of the second tool 310 (defined by, for example, the difference between height $H_1$ of the decompressed spring and compressed height $H_2$), where the bottom surface of the shaft assembly 200 extends past a bottom surface of the body 312 of the second tool 310, clearing foam and/or film layer at the top of the hole 420 (i.e., flash) formed in the foam body 400.

Referring again to FIG. 3A, cavity 314 in second tool 310 includes a bottom portion 315 of the cavity 314 sized and shaped to correspond with and receive a piston 210 of the shaft assembly 200, and a top portion 316 sized to receive a shaft body 230 of the shaft assembly 200. As discussed below, the piston is sized based on engagement with the protrusion 324 such that contact between the piston 210 and protrusion 324 forms a flush seal to form the hole in the molded foam body 400. Piston 210 is positioned such that a portion is within the cavity 314 in both the engaged and disengaged positions, and, in the disengaged position, a portion extends past the bottom surface of the body 312 of the second tool 310.

Referring again to FIG. 2, the shaft assembly 200 includes piston 210 and shaft body 230. Piston 210 is sized such that an engagement surface 212 of the piston 210 is substantially the same size as the top end of the protrusion 324, forming a flush edge when the tool assembly is in the engaged position (as shown in FIG. 3B), and so the movable plunger 200 can clear flash and a thin film by piston 210 fitting in the opening of hole 420. The interface between the piston 210 and the protrusion 324 may be flat surfaces or be surfaces with corresponding shapes, fitting together as male-female parts to seal the tool and prevent foam from leaking over the protrusion 324. Piston 210 may be formed of any suitable material with low adhesion with foam, thus acting as a non-stick surface in the mold tool assembly. The material is also compliant for sealing the piston 210 against a protrusion 324 when the tool closes, with a sufficient mechanical strength to prevent deformation of the piston 210 within the temperature range of foam molding. A suitable material for the piston 210 includes, but is not limited to, polytetrafluoroethylene (PTFE). Further, as shown in FIG. 2 and FIGS. 3A-C, the piston 210 has a radius larger than the radius of the shaft body 230 such that the piston 210 extends farther out radially than the shaft body 230. The piston 210 forms a barrier to foam flowing into the cavity 314 in the second tool 310 (as shown in FIGS. 3A-C).

Referring again to FIG. 2 and FIGS. 3A-C, shaft body 230 is sized per the top portion 316 of cavity 314, which is sized to prevent the piston 210 from sliding into the top portion 316 of the cavity and out of the top of second tool 310. As shown in the embodiment of FIGS. 3A-C, the shaft body 230 may also include optional stopper 232 at a top end outside of the cavity 314. Stopper 232 may be connected to the shaft body 230 and contact an outer surface of the body 312 of the second tool 310 when in the disengaged position to limit the vertical movement of the movable plunger 200. Stopper 232 may be a circlip or any suitable feature or features to limit the shaft body 230 from lowering into the cavity 314 in the disengaged position, and the position of stopper 232 is not intended to be limiting and is shown as an example for how the vertical movement can be limited.

In one or more embodiments, referring again to FIG. 2, shaft assembly 200 includes the piston 210 surrounding connector 220. Although the piston 210 and shaft body 230 are shown as separate features connected by connector 220, the piston 210 and shaft body 230 could, in certain embodiments (not shown), be formed as one single body, movable by the actuator. Connector 220 may be any suitable device to connect piston 210 with the shaft body 230, such as, but not limited to a cap head screw (as shown in FIG. 2). Although connector 220 is shown as a separate feature in FIG. 2, the connector 220 may be integrated with the piston 210 and/or shaft body 230, or be omitted such that the piston 210 and shaft body 230 are directly secured. As shown in FIG. 2, the top end of connector 220 is housed within the shaft body 230, having a cavity 260 defined by the shaft body 230 for receiving the top end of the connector 220. The base of shaft body 230 is connected to the piston 210 such that the connector 220 extends from the piston 210 up into the cavity 260 of the shaft body 230. In the embodiment shown in FIG. 2, the piston 210 forms a contact surface around the bottom portion of connector 220 for engaging the protrusion 324.

Referring again to FIG. 2, the shaft assembly 200 includes, in certain embodiments, a spring 250 as the actuator for moving the shaft assembly 200 from the engaged and disengaged positions. Spring 250, as shown in the embodiment of FIG. 2, is sized to fit around the shaft body 230, and rest on and contact the piston 210 (because of the larger radius of piston 210). Although the spring 250 is shown around the shaft body 230 in FIG. 2, in other embodiments where the actuator is a spring, the spring may be positioned in any suitable manner such that it is compressed and decompressed upon movement of movable plunger 200 when the mold tool is closed and opened. For example, in certain other embodiments (not shown), the spring may be positioned above shaft body 230 in the cavity 314. Each movable plunger (corresponding to each protrusion in the first tool 320) may individually include an actuator spring 250 for moving the plunger 200. The spring 250 as shown in in the Figures is not fixedly connected to the shaft body 230 or the piston 210, but is movably placed over the shaft assembly such that it can be compressed due to force on the connector 220 resulting in movement of the shaft assembly 200, however one or both ends of the spring 250 may be fixed to the movable plunger 200 and/or the second tool 310.

In embodiments where the actuator is a spring 250, the spring 250 may be configured to have a stroke (i.e., difference in length between compressed and decompressed state) based on the body 312 and dimensions of the second tool 310 and the cavity 314 for the plunger 200. The stroke may be selected based on the height of the second tool 310 and the length of the movable plunger 200 such that the spring 250 can move the plunger 200 to the disengaged position upon opening of the tool, and sufficiently compress to store enough energy such that flash can be cleared and the cavity 314 can be sealed while the tool assembly is in the engaged state. In certain embodiments, the stroke of the spring may be about 2 to 10 mm, in other embodiments the stroke may be about 3 to 8 mm, and in yet other embodiments the stroke may be 4 to 6 mm. In one or more embodiments, the spring force of spring 250 is sufficient to overcome the forces of friction between the movable plunger 200 and the walls of body 312 defining cavity 314 to move the plunger 200 into the hole 420 when opening the tool and break a film/clear flash, yet is compliant enough to allow the plunger to compress the spring when the tool closes by the force of the protrusion. In at least one embodiment, the spring has a force of about 25 to 55 N, in other embodiments a force of about 30 to 50 N, and in yet another embodiment about 35 to 45 N. Furthermore, the spring rate may be any suitable rate for moving the plunger 200 to clear flash or the thin film from the hole, such as, but not limited to, at least about 5 N/mm. In certain embodiments, the spring rate is about 5 N/mm to 50 N/mm, in other embodiments, the spring rate is about 5 N/mm to 35 N/mm, and in yet another embodiment, the spring rate is about 5 N/mm to 25 N/mm.

Referring again to FIG. 2 and FIGS. 3A-C, piston 210 further includes, in one or more embodiments, a rib portion 240 along at least a portion of the outer periphery of the piston 210. In certain embodiments, the rib portion 240 extends along the entire periphery of the piston 210. The rib portion 240 further provides a barrier to foam leaking into the cavity 314 of the second tool 310 when the mold assembly is closed by being in contact with the inner wall of body 312 defining cavity 314, such that foam is prevented from leaking over the top of the protrusion and around the piston 210 up toward shaft body 230. The rib portion 240 also scrapes the cavity 314, removing flash and foam from the edges, as the shaft assembly 200 moves between the engaged and disengaged positions by way of its contact with the cavity 314 walls. The rib portion 240 is made of any suitable material, such as but not limited to PTFE, polyvinylfluoride (PVF), or polyoxymethylene (POM), such that the rib portion 240 has sufficient mechanical strength break scrape foam from the cavity within the operating temperature range of the mold tool assembly, and have a low adhesion with foam, thus acting as a non-stick surface in the mold tool assembly, as the piston 210 breaks film formed over the hole in the foam cushion, as described in detail below and shown in FIGS. 3A-C.

When the mold tool assembly 300 is closed and in the engaged position, referring again to FIG. 3B, the interface between the second tool 310 and the first tool 320 is sealed via the shaft assembly 200 contacting with the protrusion 324 (via the piston 210) to seal the cavity 314, along with rib 240 providing additional sealing for the cavity 314. Thus, the cavity 314 can be sized and shaped to receive the shaft assembly 200 via interference fit with suitable friction such that the shaft assembly 200 is movable along a vertical axis of the second tool by the actuator and can provide sealing (during molding) and flash removal (during disengagement) at the continuous hole in the foam body 400. The protrusion 324 engages the piston 210, such that the shaft assembly 200 moves up into the cavity 314, and compresses the spring 250 such that it has a height H2. Thus, contact between the protrusion 324 and the piston 210 compresses the spring 250 in the engaged position, such that the interface between the first and second tools 320, 310 is sealed at the contact point 410, between the protrusion 324 and the piston 210 to prevent foam leakage over the protrusion 324. In this engaged position, as shown in FIG. 3B, the piston 210 is shifted upward into the cavity 314 by the difference in height between H1 and H2, per the displacement of the spring 250. Although in FIG. 3B, the piston 210 is shown substantially aligned with the bottom surface of the body 312 of the second tool 310, the engaged position may have the piston 210 either vertically above or vertically below the bottom surface of the body 312 in other embodiments (not shown), and would still seal the mold tool assembly via contact at the contact point 410 with the protrusion 324.

During the molding of foam body 400, when the spring 250 is compressed, the bottom of the piston 210 is shifted upward along a vertical axis of the tool assembly 300 by the difference in height between H1 and H2 such that the bottom of the piston 210 may be aligned with the bottom surface of body 312 of second tool 310, where the protrusion 324 contacts the piston 210, or, in some embodiments (based on the spring force and design) the bottom of the piston 210 may still extend past the bottom surface of the second tool body 312, per the displacement caused by the compressed spring, and form the seal via direct contact with the protrusion 324 at the contact point 410. Thus, the foam body 400 can be molded around the protrusion 324 and a hole can be formed without leakage forming a film over the hole due to the barrier formed by the shaft assembly 200 at the opening of cavity 314.

As shown in FIG. 3C, when the mold tool assembly 300 is opened such that the second tool 310 and first tool 320 separate, and foam body 400 has been formed with the hole 420. Upon opening of the tool assembly 300, the spring 250 is decompressed back to height $H_1$ due to the disengagement of the shaft assembly 200 and the protrusion 324. As such, the shaft assembly 200 extends back down from cavity 314 and the piston 210 extends past the surface of the second tool body 312 and clears flash at the edges of the hole 420 opening or any film that may have formed across the top of the hole 420. As the piston 210 lowers, rib portion 240 also clears the edges of cavity 314 such that foam does not migrate into the cavity 314 of the second tool 310. The rib portion 240 can clear the cavity whether the piston is substantially aligned with the bottom surface of body 312 in the engaged state, vertically above the bottom surface, or vertically below the bottom surface, based on the movement of the shaft assembly 200 along the vertical axis and the positioning of the rib portion 240. Thus, the foam body 400 with the hole 420 is molded without additional post-processing, as the shaft assembly 200 is able to prevent leaks and clear flash.

According to another embodiment, a method of molding a foam body with continuous holes is provided. A first tool and a second tool are provided, which cooperate to form the mold tool assembly for forming the foam body. The first tool has at least one protrusion, which forms a respective hole in the foam body. The protrusion has a surface at a top end with at least a periphery for engaging at least a portion of a shaft assembly. The second tool has a corresponding cavity for each of the protrusions of the first tool. The cavity has an opening defined in the surface of the second tool. Furthermore, the cavity includes the shaft assembly positioned therein. The method also includes closing the mold tool assembly such that the protrusion engages the shaft assembly and the cavity is sealed, and molding a foam body with holes formed therein. The shaft assembly includes a piston which engages at least the periphery of the protrusion to push the shaft assembly such that a spring of the shaft assembly is compressed, and the shaft assembly moves upward into the cavity. The engagement of at least the periphery and the shaft assembly forms a flush edge for forming the hole in the foam body. The method further includes opening the mold tool assembly to separate the first and second tools such that the spring is decompressed and moves the shaft assembly downward into the hole to clear flash or thin films formed during the molding step.

According to one or more embodiments, a mold tool assembly for forming holes includes a shaft assembly is provided for preventing foam leak into the mold tool cavity and for clearing flash from the holes without post-processing steps. The shaft assembly engages the protrusion, is shifted upward into the cavity to seal the cavity. After the foam body has been molded, when the tool is opened, an actuator pushes the shaft assembly back downward, such that any thin layer that may have formed over the hole opening or flash at the edges of the hole is cleared by the movement of the shaft assembly vertically downward into the hole. The shaft assembly also may include a rib portion around at least a portion of the periphery of the shaft assembly such that the rib portion seals the cavity by contacting the inner wall of the cavity and clears foam along the cavity walls during movement of the shaft assembly within the cavity. As such, holes in the foam body can be formed without requiring post-processing to remove flash and films from the holes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mold tool assembly comprising:
   a first tool having a protrusion for producing a hole in a foam body;
   a second tool configured to cooperate with the first tool to define a foam body cavity for molding the foam body, the second tool defining a protrusion cavity corresponding to the protrusion such that the protrusion of the first tool is aligned with the protrusion cavity of the second tool;
   a movable plunger for clearing flash corresponding to and located at least partially within the protrusion cavity in the second tool aligned with the protrusion and positioned such that the movable plunger seals the protrusion cavity from foam entering the protrusion cavity, and movable between a disengaged position when the first and second tools are separated, and an engaged position when the first and second tools are closed; and
   an actuator configured to move the movable plunger between the engaged position and the disengaged position,
   wherein, in the engaged position during foam fill, the movable plunger contacts the protrusion, and the movable plunger and protrusion form a seal at a contact point such that foam is inhibited from flowing between the movable plunger and the protrusion and a bottom of the movable plunger is aligned with the bottom surface of the second tool, and in the disengaged position, at least a portion of the movable plunger extends below the bottom surface of the second tool.

2. The mold tool assembly of claim 1, wherein the actuator has a bias in the disengaged position, such that in the engaged position the protrusion pushes the movable plunger against the bias.

3. The mold tool assembly of claim 2, wherein the actuator is a spring and the movable plunger is displaced between the engaged and disengaged positions based on compression and decompression of the spring.

4. The mold tool assembly of claim 3, wherein the spring is positioned around a shaft body of the movable plunger within the protrusion cavity to compress and decompress based on movement of the movable plunger.

5. The mold tool assembly of claim 3, wherein the spring has a spring rate of at least 5 N/mm.

6. The mold tool assembly of claim 1, wherein the movable plunger includes a rib portion around at least a portion of a periphery of the movable plunger.

7. The mold tool assembly of claim 6, wherein the rib portion contacts an inner wall of the second tool defining the protrusion cavity and clears foam from the protrusion cavity when the movable plunger moves between the engaged and disengaged positions.

8. The mold tool assembly of claim 1, wherein the actuator is a hydraulic actuator for pushing the movable plunger into the disengaged position after the movable plunger is moved into the engaged position via engagement with the protrusion.

9. A mold tool assembly comprising:
   a first tool having a protrusion for producing a hole in a foam body;
   a second tool configured to cooperate with the first tool to define a foam body cavity for molding the foam body, the second tool defining a protrusion cavity corresponding to the protrusion such that the protrusion of the first tool is aligned with the protrusion cavity of the second tool; and a movable plunger for clearing flash, the movable plunger aligned with the protrusion and located at least partially within the protrusion cavity in the second tool such that the movable plunger seals the protrusion cavity from foam entering the protrusion cavity, the movable plunger being movable between a disengaged position when the first and second tools are separated, and an engaged position when the first and second tools are closed, the movable plunger being movable between the engaged position and the disengaged position, and having a bias in the disengaged position;

wherein, in the engaged position during foam fill, the movable plunger contacts the protrusion to form a seal at a contact point between the movable plunger and the protrusion such that foam is inhibited from flowing between the movable plunger and the protrusion, and a bottom of the movable plunger is aligned with a bottom surface of the second tool, and in the disengaged position, the bias shifts the movable plunger such that at least a portion of the movable plunger extends below the bottom surface of the second tool into the hole.

10. The mold tool assembly of claim 9, wherein the first tool includes a plurality of protrusions and the second tool includes a plurality of protrusion cavities corresponding to the plurality of protrusions such that each of the plurality of protrusions of the first tool are aligned with a respective protrusion cavity of the plurality of protrusion cavities of the second tool.

11. The mold tool assembly of claim 10, wherein the mold tool assembly includes a plurality of movable plungers with a respective movable plunger for each of the plurality of protrusion cavities.

12. The mold tool assembly of claim 9, further comprising an actuator cooperating with the movable plunger to bias the movable plunger in the disengaged position, wherein the actuator is a spring having a spring rate of at least 5 N/mm.

13. The mold tool assembly of claim 9, wherein the protrusion has a diameter of 5 to 35 mm.

14. The mold tool assembly of claim 9, wherein the movable plunger includes a rib portion around at least a portion of a periphery of the movable plunger, the rib portion contacting an inner wall of the second tool defining the protrusion cavity and clears foam from the protrusion cavity when the movable plunger moves between the engaged and disengaged positions.

* * * * *